(12) United States Patent
Tate et al.

(10) Patent No.: US 10,668,419 B2
(45) Date of Patent: Jun. 2, 2020

(54) ENGINE PANEL FILTER AND HOUSING SYSTEM

(71) Applicants: Jason LaMarr Tate, Thompsons Station, TN (US); Thomas B. Green, College Grove, TN (US); John Michlitsch, Summertown, TN (US)

(72) Inventors: Jason LaMarr Tate, Thompsons Station, TN (US); Thomas B. Green, College Grove, TN (US); John Michlitsch, Summertown, TN (US)

(73) Assignee: CLARCOR Inc., Franklin, TN (US)

( * ) Notice: Subject to any disclaimer, the term of this patent is extended or adjusted under 35 U.S.C. 154(b) by 299 days.

(21) Appl. No.: 15/362,063

(22) Filed: Nov. 28, 2016

(65) Prior Publication Data

US 2017/0151520 A1   Jun. 1, 2017

Related U.S. Application Data

(60) Provisional application No. 62/260,875, filed on Nov. 30, 2015.

(51) Int. Cl.
*B01D 39/14* (2006.01)
*B01D 46/10* (2006.01)
(Continued)

(52) U.S. Cl.
CPC ......... *B01D 46/0008* (2013.01); *B01D 39/10* (2013.01); *B01D 39/14* (2013.01); *B01D 46/0002* (2013.01); *B01D 46/0026* (2013.01); *B01D 46/10* (2013.01); *B01D 46/521* (2013.01); *B01D 50/002* (2013.01); *F02M 35/02466* (2013.01); *B01D 2267/40* (2013.01);
(Continued)

(58) Field of Classification Search
CPC ............ B01D 46/0036; B01D 46/0005; B01D 46/002; B01D 46/0023; B01D 46/2411; B01D 46/0008; B01D 39/10; B01D 39/14; B01D 46/521; B01D 2267/40; B01D 2271/02; B01D 2279/60; B01D 2271/022; B01D 46/0026; B01D 46/10; B01D 50/002; F02M 35/0203; F02M 35/02466; F01N 3/0212
USPC .............. 55/357, 385.3, 498, 502, 495, 521, 55/DIG. 5; 123/198 E; 60/311; 210/450
See application file for complete search history.

(56) References Cited

U.S. PATENT DOCUMENTS 2,690,802 A   10/1954   Russell
2,907,407 A   10/1959   Engle et al.
(Continued)

FOREIGN PATENT DOCUMENTS

DE        19755466 A1   6/1999
WO   WO 2014/018528 A1   1/2014
(Continued)

*Primary Examiner* — Minh Chau T Pham
(74) *Attorney, Agent, or Firm* — Reinhart Boerner Van Deuren P.C.

(57) ABSTRACT

A filter element and/or filter assembly such as for engine air filtration is provided that may include a filter housing, a pre-cleaner or cover, a primary filter element and optionally a secondary filter element. Different components may share a common seal to seal against unfiltered airflow. For example the secondary filter and the primary filter may use the same seal that may be carried by the primary filter. The secondary filter may also surround the primary filter.

33 Claims, 9 Drawing Sheets (51) Int. Cl.
  *B01D 46/00* (2006.01)
  *B01D 50/00* (2006.01)
  *B01D 39/10* (2006.01)
  *B01D 46/52* (2006.01)
  *F02M 35/024* (2006.01)

(52) U.S. Cl.
  CPC .... *B01D 2271/02* (2013.01); *B01D 2271/022* (2013.01); *B01D 2279/60* (2013.01)

(56) References Cited

U.S. PATENT DOCUMENTS

| | | | |
|---|---|---|---|
| 3,635,001 A | 1/1972 | Komroff et al. | |
| 4,218,223 A | 8/1980 | Lidstone et al. | |
| 4,746,340 A | 5/1988 | Durre et al. | |
| 5,125,941 A | 6/1992 | Ernst et al. | |
| 5,290,447 A | 3/1994 | Lippold | |
| 5,332,409 A | 7/1994 | Dralle | |
| 5,725,624 A | 3/1998 | Ernst et al. | |
| 5,804,014 A | 9/1998 | Kähler | |
| 5,820,646 A | 10/1998 | Gillingham et al. | |
| 6,190,432 B1 * | 2/2001 | Gieseke | B01D 46/0001 55/385.3 |
| 6,231,630 B1 | 5/2001 | Ernst et al. | |
| 6,290,635 B1 | 9/2001 | Demmel et al. | |
| 6,348,084 B1 | 2/2002 | Gieseke et al. | |
| 6,508,851 B2 | 1/2003 | Goerg | |
| 6,685,833 B2 | 2/2004 | Lippold | |
| 6,736,871 B1 * | 5/2004 | Green | B01D 46/0036 55/385.3 |
| 6,811,588 B2 * | 11/2004 | Niakin | B01D 39/083 55/385.3 |
| 6,966,940 B2 * | 11/2005 | Krisko | B01D 45/12 55/497 |
| 7,425,227 B1 | 9/2008 | Hutchison et al. | |
| 7,540,895 B2 * | 6/2009 | Furseth | B01D 46/002 123/198 E |
| 7,625,418 B1 | 12/2009 | Choi | |
| 7,625,419 B2 | 12/2009 | Nelson et al. | |
| 7,674,308 B2 | 3/2010 | Krisko et al. | |
| 7,877,989 B1 * | 2/2011 | Kirsch | F01N 3/0212 60/311 |
| 7,905,936 B2 * | 3/2011 | Coulonvaux | B01D 46/0023 55/357 |
| 8,034,144 B2 | 10/2011 | Gieseke et al. | |
| 8,035,145 B2 | 10/2011 | Boehrs et al. | |
| 8,216,334 B2 | 7/2012 | Nelson et al. | |
| 8,277,532 B2 | 10/2012 | Reichter et al. | |
| 8,298,308 B2 * | 10/2012 | Li | F02M 35/0203 123/198 E |
| 8,343,245 B2 * | 1/2013 | Coulonvaux | B01D 46/0023 55/357 |
| 8,409,312 B2 | 4/2013 | Görg et al. | |
| 8,551,207 B2 * | 10/2013 | Swanson | B01D 46/2411 55/502 |
| 8,685,130 B2 | 4/2014 | Nelson et al. | |
| 8,696,782 B2 | 4/2014 | Muenkel | |
| 8,876,931 B2 * | 11/2014 | Braithwaite | B01D 46/2411 210/232 |
| 10,183,248 B2 * | 1/2019 | Ishikawa | B01D 46/0006 |
| 2002/0069625 A1 * | 6/2002 | Stass | F02M 35/0203 55/385.3 |
| 2005/0072131 A1 | 4/2005 | Tate et al. | |
| 2005/0284116 A1 | 12/2005 | Duffy | |
| 2008/0016832 A1 * | 1/2008 | Krisko | B01D 45/16 55/342 |
| 2008/0110146 A1 * | 5/2008 | Germain | B01D 46/0005 55/385.3 |
| 2008/0196368 A1 * | 8/2008 | Waibel | B01D 45/16 55/385.3 |
| 2008/0276583 A1 * | 11/2008 | Munkel | B01D 46/0004 55/498 |
| 2010/0043367 A1 | 2/2010 | Desjardins | |
| 2011/0056383 A1 * | 3/2011 | Make | B01D 46/0023 96/396 |
| 2011/0126713 A1 | 6/2011 | Legare et al. | |
| 2011/0185689 A1 | 8/2011 | Raether et al. | |
| 2011/0186504 A1 | 8/2011 | Rocklitz | |
| 2011/0308214 A1 | 12/2011 | Jessberger et al. | |
| 2013/0305930 A1 | 11/2013 | Oh | |
| 2014/0009344 A1 | 1/2014 | Zhu et al. | |
| 2014/0137524 A1 | 5/2014 | Jarrier | |
| 2014/0223872 A1 | 8/2014 | Bao et al. | |
| 2014/0250843 A1 * | 9/2014 | Krull | B01D 46/0005 55/357 |
| 2014/0260139 A1 | 9/2014 | Merritt et al. | |
| 2015/0013289 A1 | 1/2015 | Hasenfratz et al. | |
| 2015/0020489 A1 | 1/2015 | Sudermann et al. | |
| 2015/0040226 A1 | 2/2015 | Baran et al. | |
| 2015/0204282 A1 | 7/2015 | Merritt et al. | |
| 2015/0273985 A1 | 10/2015 | Luley et al. | |
| 2016/0045848 A1 | 2/2016 | Campbell et al. | |
| 2016/0067647 A1 | 3/2016 | Tate et al. | |
| 2017/0014743 A1 | 1/2017 | Varghese et al. | |
| 2019/0224605 A1 * | 7/2019 | Lin | B01D 45/16 |

FOREIGN PATENT DOCUMENTS

| | | |
|---|---|---|
| WO | WO 2015/040226 A1 | 3/2015 |
| WO | WO 2017/031168 A1 | 2/2017 |

\* cited by examiner

ENGINE PANEL FILTER AND HOUSING SYSTEM

CROSS-REFERENCE TO RELATED PATENT APPLICATION

This patent application claims the benefit of U.S. Provisional Patent Application No. 62/260,875, filed Nov. 30, 2015, the entire teachings and disclosure of which are incorporated herein by reference thereto.

FIELD OF THE INVENTION

This invention generally relates to filter elements and/or filter assemblies such as for engine air filtration that may comprise filter housings, precleaners, primary and/or secondary filter elements.

BACKGROUND OF THE INVENTION

Engine air filtration systems often comprise filter housings, precleaners, primary and/or secondary filter elements. Sometimes the secondary filter element may not be employed and/or a precleaner may not be employed.

The present invention pertains to various improvements relating to such various air filtration systems.

BRIEF SUMMARY OF THE INVENTION

The present invention relates to filter elements and/or filter assemblies such as for engine air filtration that may comprise one or more of the following: a filter housing, a precleaner, a primary filter element and/or a secondary filter element.

According to an embodiment of the present invention, an air filter element includes a filter media pack comprising filter media. The filter media pack has an inlet face and an outlet face. Fluid can flow from the inlet face to the outlet face by passing through the filter media to filter the fluid. The air filter element also includes a gasket arranged in surrounding relation of one of the inlet face and the outlet face. The gasket extends about a perimeter of the filter media pack to form a complete ring. The gasket has first and second opposed end surfaces and an outer perimeter surface extending between the first and second opposed end surfaces. A receiving channel is recessed into the first end surface of the gasket in surrounding relation of the filter media pack.

According to a more particular embodiment, the receiving channel is formed by seal material of the gasket and the receiving channel is surrounded by a continuous rib formed by the seal material.

According to a more particular embodiment, the gasket is at least partially raised above the inlet face and the seal material is integrally molded to the filter media pack to secure and seal the gasket to the filter media pack and prevent leakage of unfiltered fluid flow therebetween.

In a more particular embodiment, the air filter element is a panel filter, with the filter media pack being pleated with a plurality of pleat tips at the inlet face and a plurality of pleat tips at the outlet face.

In a more particular embodiment, a screen member extends across the inlet face and is embedded in the seal material of the gasket.

In a more particular embodiment, the air filter element is incorporated into a filter assembly that further comprises a secondary filter element comprising a casing. The casing includes a casing body surrounding the filter media pack and extending between the inlet face and the outlet face. The casing includes a flange projecting radially outwardly from the casing body. The flange is received in the receiving channel and a sealed position in the receiving channel whereby a continuous seal surrounding the filter media pack is formed between the projecting flange and the gasket. The secondary filter further comprises a filter member (screen or other filter) carried by the casing body and extending over the outlet face of the filter media pack.

In a more particular embodiment, the filter member comprises a planar mesh screen material, and the filter media comprises a non-woven fibrous media comprising at least one of glass, cellulose or polymer material.

In a more particular embodiment, the air filter element and the secondary filter element are both quadrilateral.

In a more particular embodiment, the air filter element and the secondary filter element have at least one variable dimension that is either a depth dimension that varies from the inlet face to the outlet, or a width or length dimension that varies between opposed sides of the quadrilateral.

In a more particular embodiment, the secondary filter element is gasket free and utilizes only the gasket of the air filter element.

According to another embodiment of the present invention, a filter element comprises a casing that includes a casing body extending from a first end to a second end and having a hollow interior defining a cavity for receiving another filter element. The filter element further comprises a filter member carried by the casing body at the second end and over the cavity, such that fluid cannot flow from the cavity through the second end without passing through the filter member.

In a more particular embodiment, the filter member comprises a planar mesh screen material.

In a more particular embodiment, the casing is formed of plastic material. The plastic material can be integrally molded to planar mesh screen material and thereby permanently secures the planar mesh screen material to the casing.

In a more particular embodiment, the filter element is incorporated into a filter assembly that further comprises an air filter installed into the cavity and sealingly engaged at a periphery to the casing.

In a more particular embodiment of such a filter assembly, the filter assembly includes a gasket that seals between the filter element and the air filter.

The gasket may have a quadrilateral shape and if so can engage a quadrilateral flange of the filter element.

In a more particular embodiment, the gasket can be integrally provided by the air filter.

In a more particular embodiment, such an assembly can comprise a filter housing defining a housing cavity comprising an outlet port and an inlet opening. The air filter can be a primary filter element that is received in the filter housing through the inlet opening. The primary filter element comprises filter media that comprises a non-woven fibrous media comprising at least one of glass, cellulose or polymer material. The filter element can be a secondary filter element for downstream use with the primary filter element. Further the assembly comprises a gasket member sealing simultaneously between the filter housing, the primary filter element, and the secondary filter element.

In a more particular embodiment of an assembly, the gasket is integrally provided by the primary filter element and defines a channel receiving a flange of the secondary filter element.

In an embodiment where the gasket is provided by the air filter, the gasket may integrally molded to the filter media.

Preferably in an more particular embodiment, the primary filter element or air filter comprises a pleated filter media pack.

In a more particular embodiment, such an assembly can further comprise a precleaner having an inlet port. The precleaner has at least an air cleaning device that utilizes air flow to separate larger particles prior to reaching the primary filter element. The precleaner can be mounted to the filter housing and can enclose the primary filter element and the secondary filter element therein.

According to another embodiment of the present invention, a filter assembly comprises a filter housing defining a housing cavity comprising an outlet port and an inlet opening. The filter assembly further comprises a primary filter element received in the filter housing through the inlet opening. The primary filter element comprising filter media that comprises a non-woven fibrous media comprising at least one of glass, cellulose or polymer material. The filter element further comprises a secondary filter element. The secondary filter element includes a casing that includes a casing body extending from a first end to a second end and having a hollow interior defining a cavity receiving the primary filter element. A filter member is carried by the casing body at the second end and over the cavity downstream of the primary filter element, such that fluid cannot flow from the cavity through the second end without passing through the filter member. The filter assembly further comprises a precleaner having an inlet port. The precleaner has at least an air cleaning device that utilizes air flow to separate larger particles prior to reaching the primary filter element, and is mounted to the filter housing and encloses the primary filter element and the secondary filter element therein. The filter element further comprises a gasket member sealing simultaneously between the filter housing, the primary filter element, the secondary filter element and the precleaner.

In a more particular embodiment, the gasket member is a single gasket member permanently attached to the primary filter element.

In a more particular embodiment, the filter housing, the primary filter element, the secondary filter element and the precleaner all have a quadrilateral shape. The filter housing defines a quadrilateral body wall surrounding the primary filter element and the secondary filter element, and an end wall defining the outlet port enclosing a first end of the quadrilateral body wall. The filter housing includes at a second end of the quadrilateral body wall a quadrilateral step comprising a planar ledge and a surrounding containment wall, and the single gasket member extends outward from the filter media and is seated on the quadrilateral step.

In a more particular embodiment, the precleaner has an axially extending quadrilateral flange facing the quadrilateral step and engaging the gasket member.

In a more particular embodiment, manually actuated latches removably secure the precleaner and the filter housing.

According to another embodiment of the present invention, a filter assembly comprises a filter housing defining a housing cavity, an outlet port and an inlet opening. The filter housing has a seating surface surrounding the housing cavity. The assembly further comprises a primary filter element received in the housing cavity and into the filter housing through the inlet opening along an install axis. The primary filter element comprises filter media that comprises a non-woven fibrous media comprising at least one of glass, cellulose or polymer material. The primary filter element has filter media extending between an inlet face and an outlet face, and a filter media depth along the install axis that is not constant and which extends between the inlet face and the outlet face. The filter media depth is shallower proximate the outlet port and deeper as the filter media transitions away from the outlet port.

In a more particular embodiment, the air filter element is a panel filter. The filter media pack is pleated with a plurality of pleat tips at the inlet face and a plurality of pleat tips at the outlet face. The pleat tips at the inlet face form a plane, and the pleat tips at the outlet face are stepped to form an incline relative to the plane at the inlet face.

In a more particular embodiment, the incline is at least 5 degrees relative to the plane at the inlet face, and the pleat tips are stepped at the outlet face to form said incline.

In a more particular embodiment, the filter housing, the primary filter element, the secondary filter element and the precleaner all have a quadrilateral shape. The filter housing defines a quadrilateral body wall surrounding the primary filter element and the secondary filter element, and an end wall defining the outlet port enclosing a first end of the quadrilateral body wall. The filter housing includes at a second end of the quadrilateral body wall a quadrilateral step comprising a planar ledge and a surrounding containment wall. The primary filter cartridge is sealed against the planar ledge by a gasket. The containment wall defines a terminating edge that lies in a plane that is inclined relative to the planar ledge.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to FIGS. 1-4, an engine filtration assembly 10 is illustrated which includes a filter housing 12, a primary filter element 14, a secondary filter element 16 and a precleaner 18.

Figure 1:
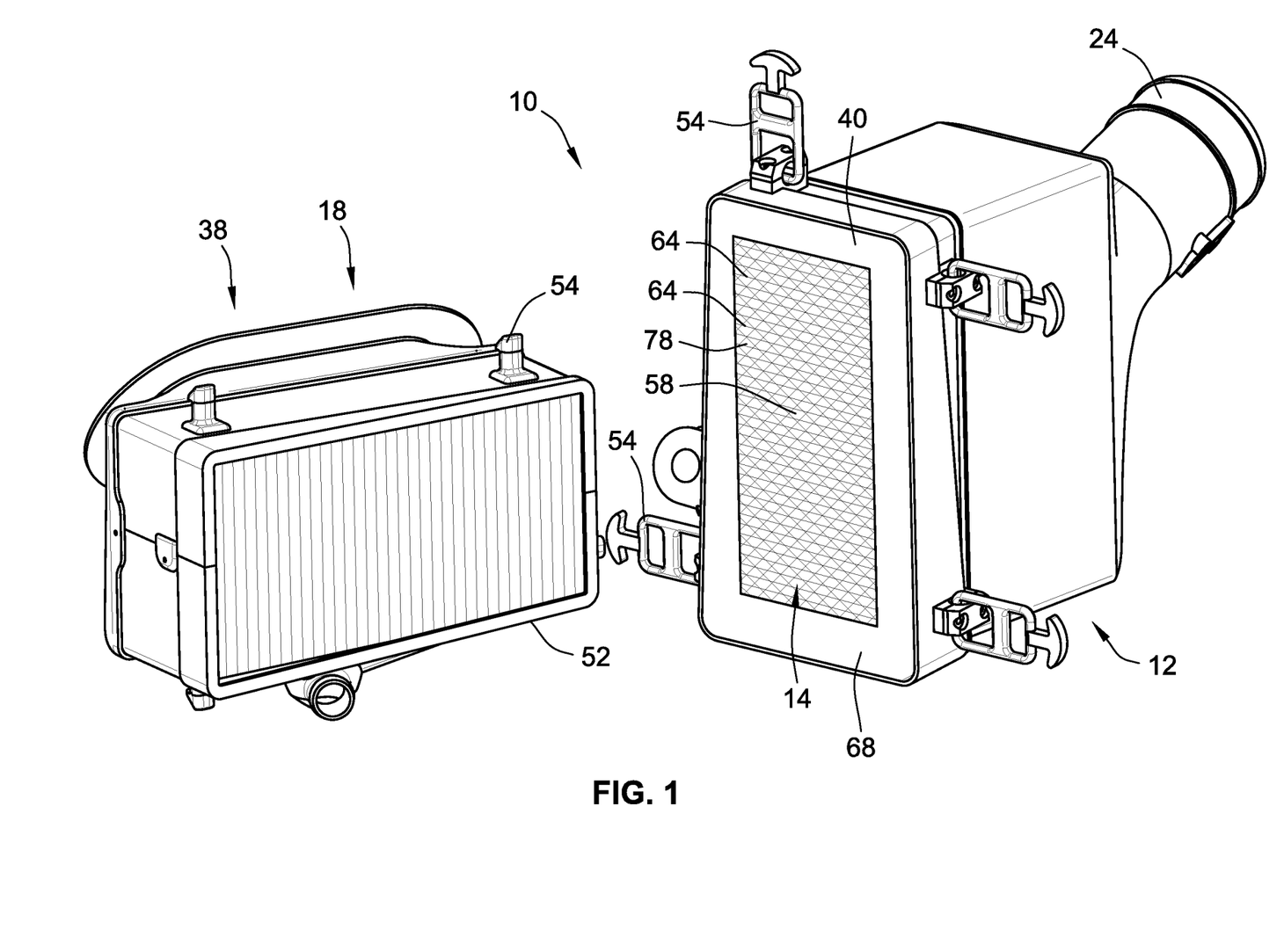
FIG. 1 is a perspective illustration of a filter assembly comprising a filter housing, a primary filter element, a secondary filter element and a precleaner; with a precleaner being shown delatched from the filter housing and the primary and secondary filter installed with the filter housing according to a first embodiment of the present invention.
Figure 2:
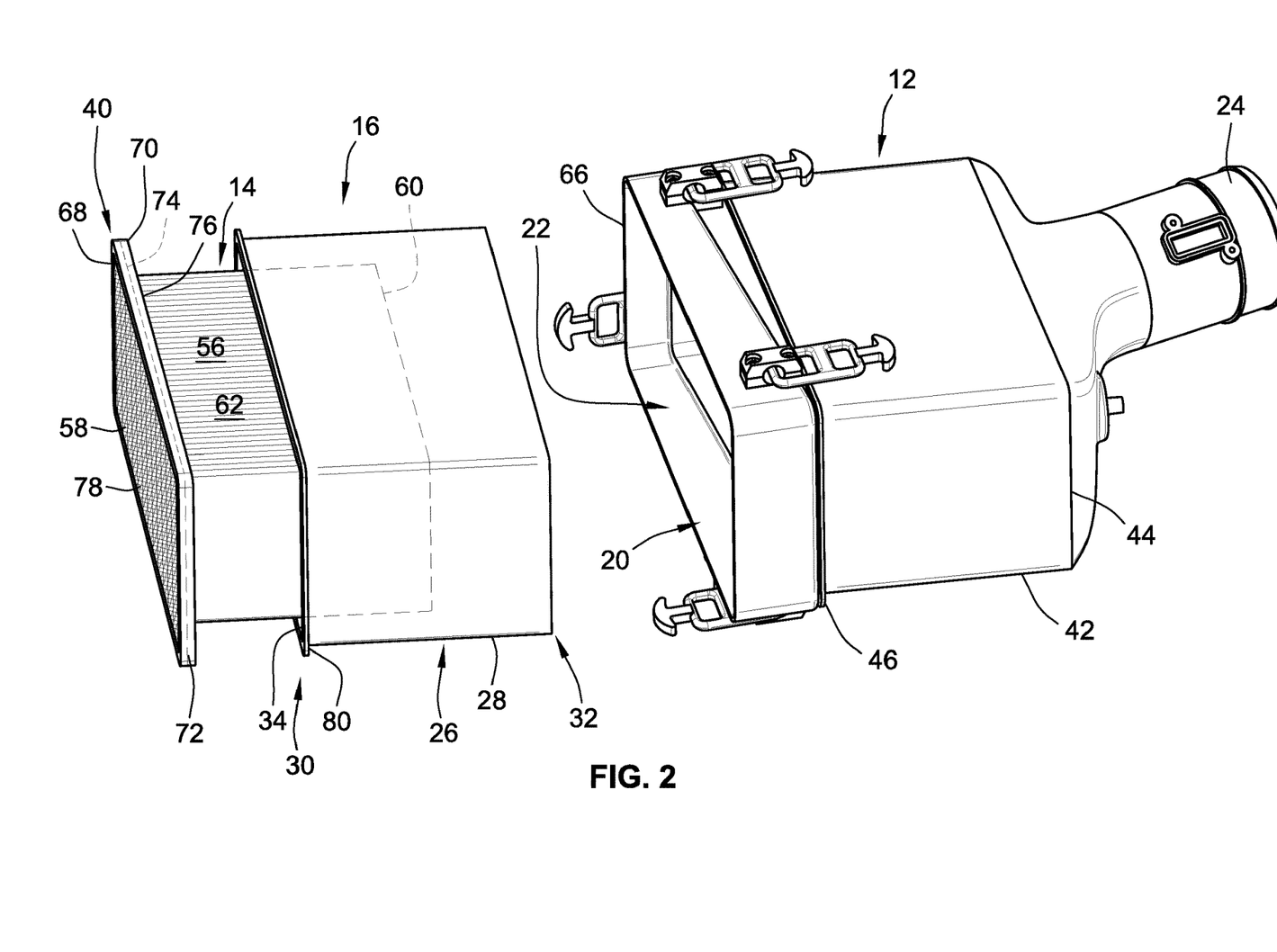
FIG. 2 is a perspective illustration of parts of the embodiment shown in FIG. 1 illustrating the filter housing with the secondary filter element removed therefrom and the primary filter element partially extending from the secondary filter element.

The filter housing 12 defines a housing cavity 20 that is sized to receive the primary filter element 14 and the secondary filter element 16. Housing cavity 20 also comprises an outlet port 24 for conveying filtered air to an engine (or other such filtered air application) and an inlet opening 22 through with the primary filter element 14 and the secondary filter element 16 can be installed and removed when desired for replacement. The primary filter element 14 is received in filter housing through the inlet opening 22, as is the secondary filter element 16.

The primary filter element 14 comprises filter media that comprises a non-woven fibrous media comprising at least one of glass, cellulose or polymer material.

Typically the primary filter element 14 will have a filtration efficiency of at least 95% for removing 1 micron particles in some applications (or larger or smaller particles and higher efficiencies in other applications).

The secondary filter element 16, when employed, will typically remove larger particles and not smaller particles as will typically be removed by the primary filter element 14. The secondary filter element 16 is used to avoid and limit clumps of dirt or large particles, leaves or other debris from entering into the outlet port 24 at the outlet end of the housing, such as when the primary filter element 14 is removed during service intervals or otherwise. As such, a planar screen member made of metal wire mesh or even plastic wire mesh with a defined pore size can be used as a surface or barrier filter.

Figure 3:
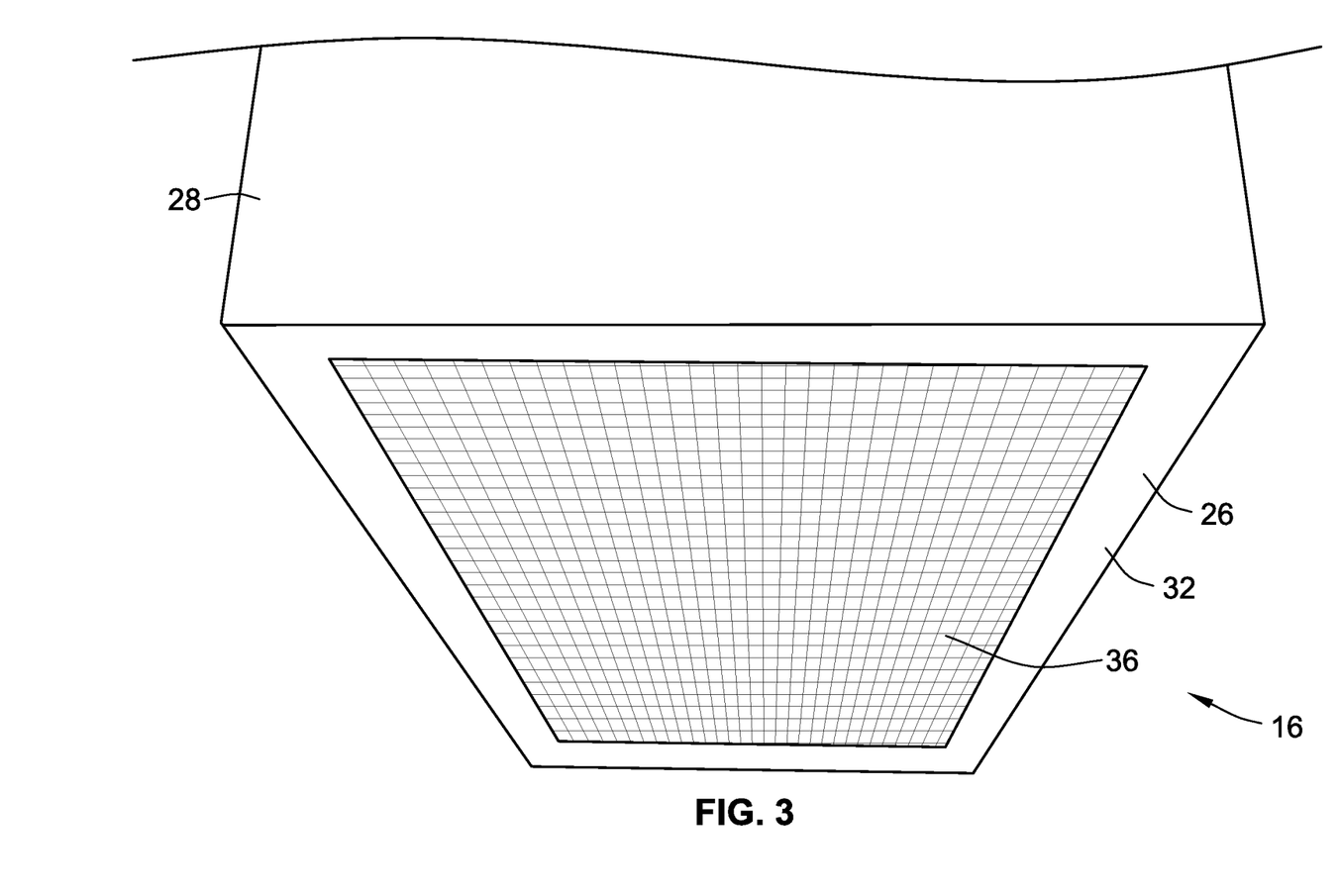
FIG. 3 is a perspective view of the secondary filter shown in the embodiment of FIGS. 1-2 with the secondary filter including an end of the casing that is integrally molded to and with a cleaner screen member.
Figure 4:
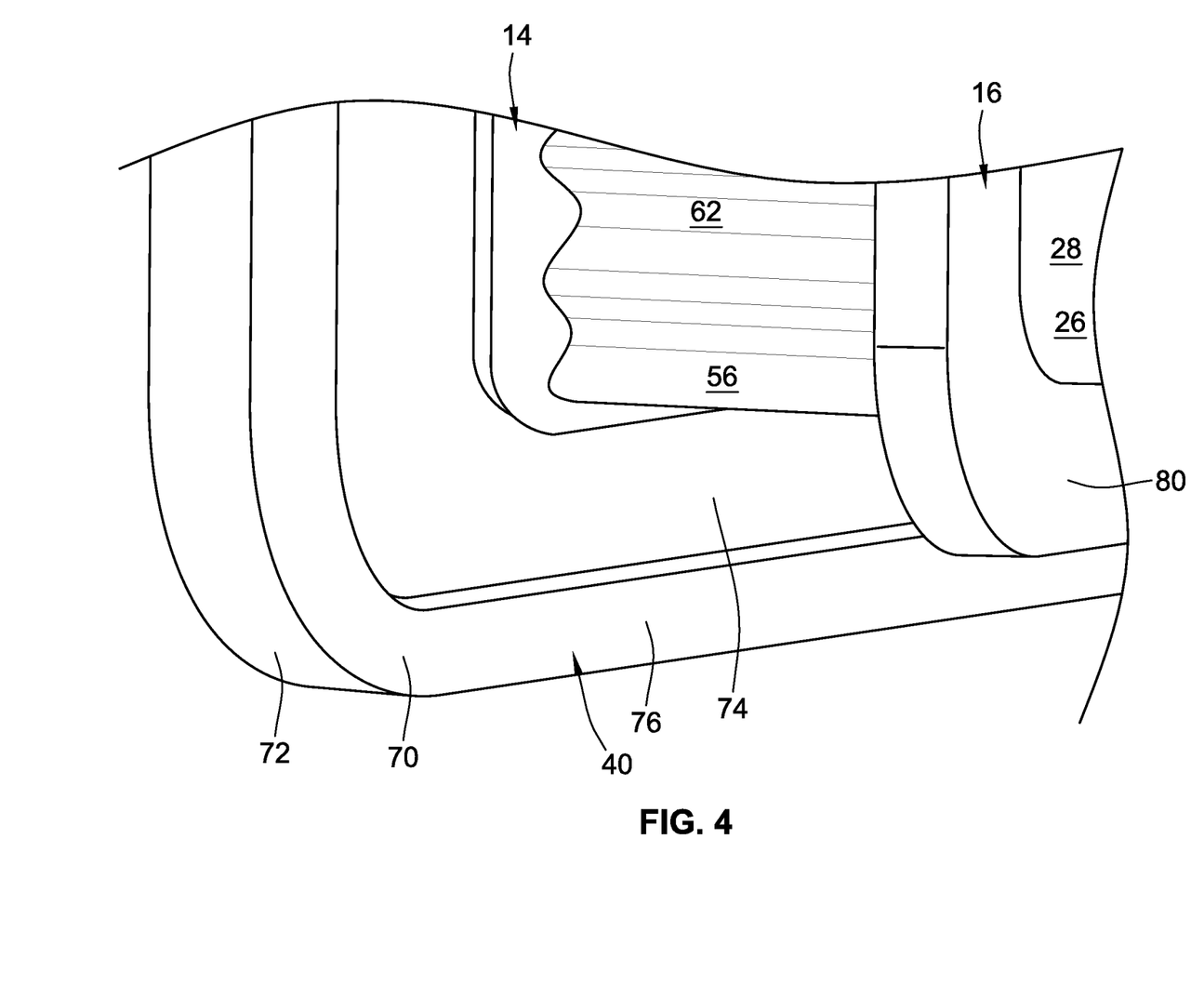
FIG. 4 is an enlarged perspective view of a portion of the primary filter element and the secondary filter element shown in the embodiment of FIGS. 1-3 to show how the secondary filter element is received within a channel of the primary filter element.
Figure 5:
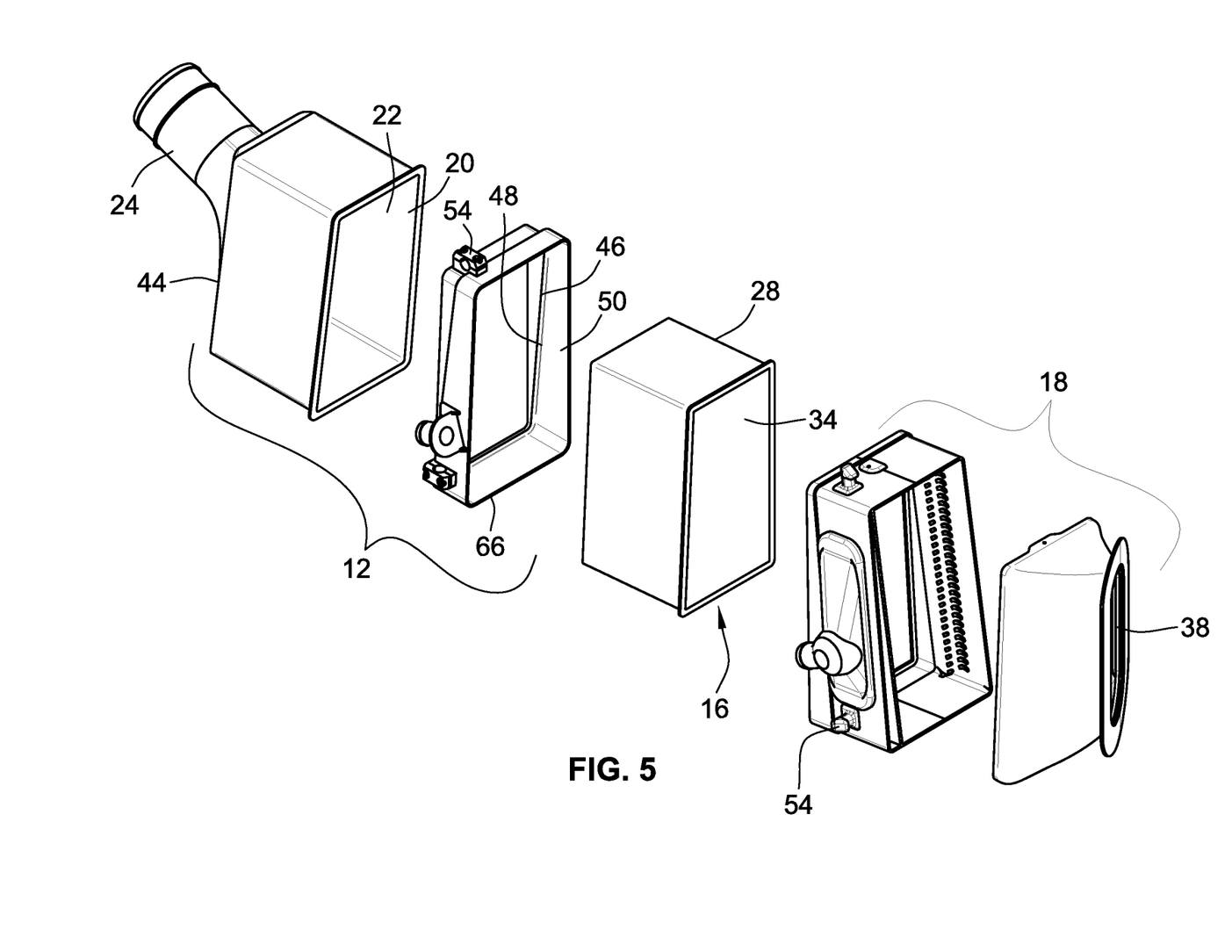
FIGS. 5-8 are exploded assembly isometric views of a filter housing, precleaner and secondary filter element similar in many respects to that of the first embodiment as will be readily understood to one of ordinary skill in the art.
Figure 6:
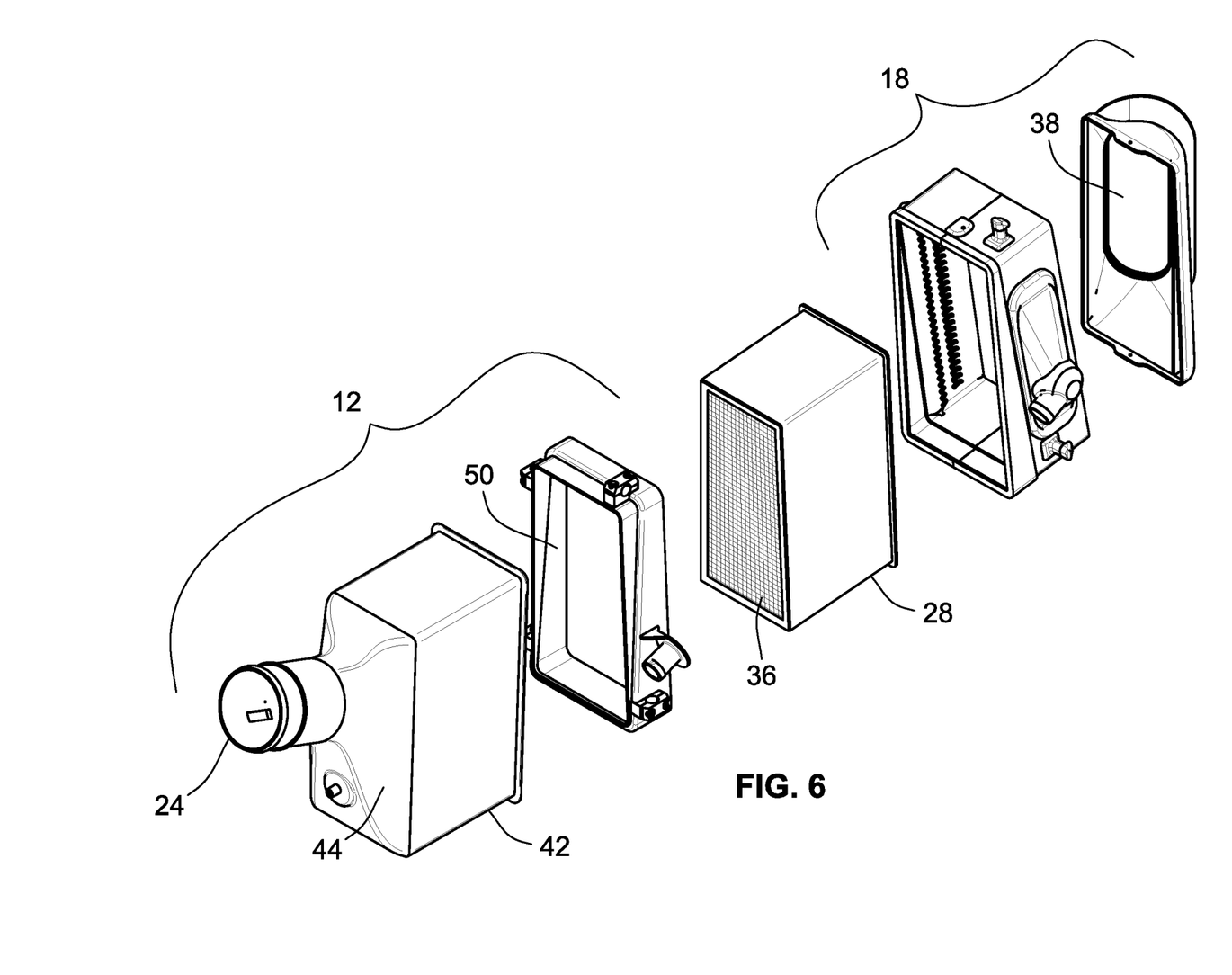
Figure 7:
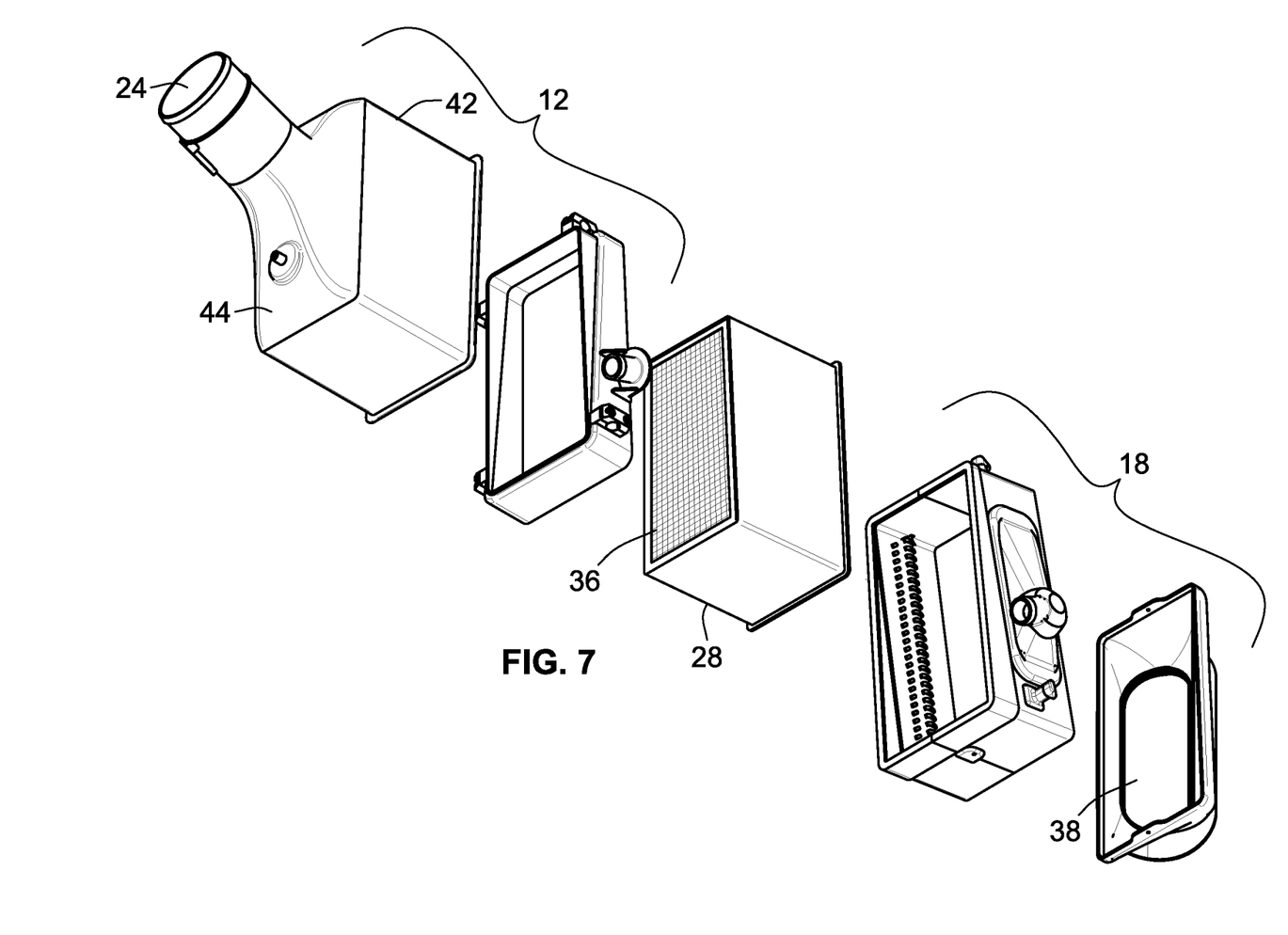
Figure 8:
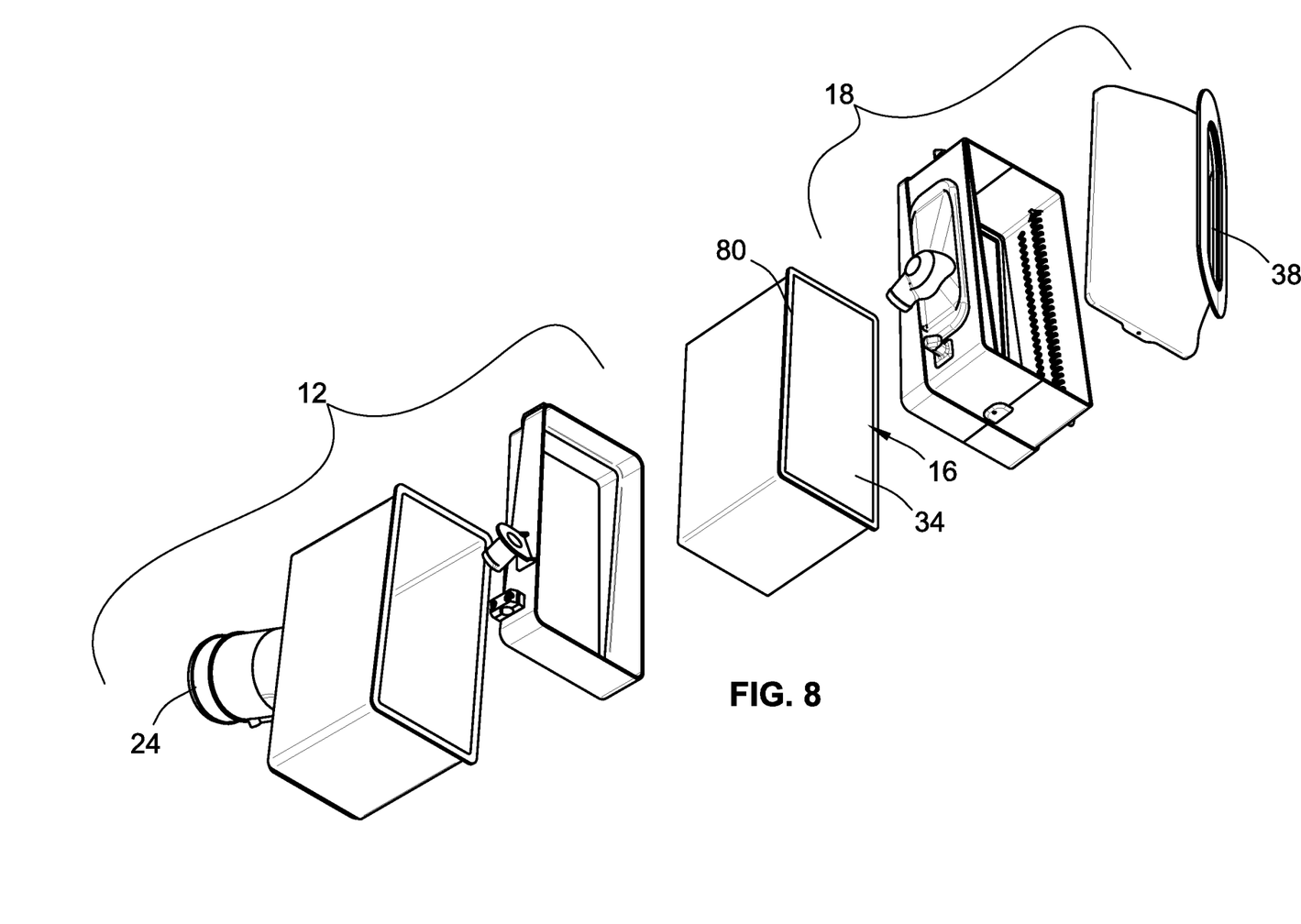
Figure 9:
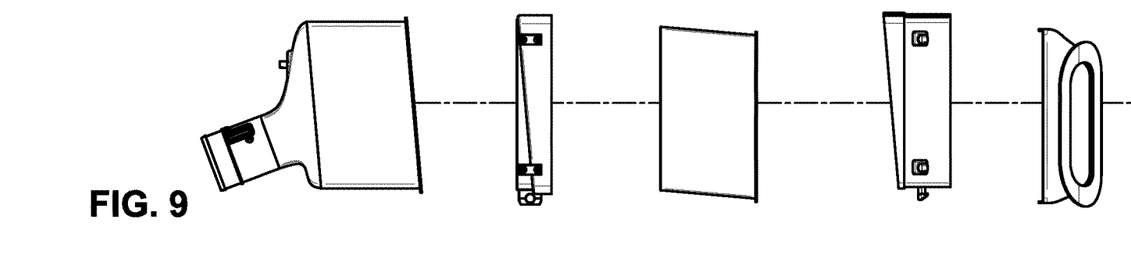
FIGS. 9-12 are four different side end views of the embodiment and assemblies shown in FIGS. 5-8 taken from four different side views.
Figure 10:
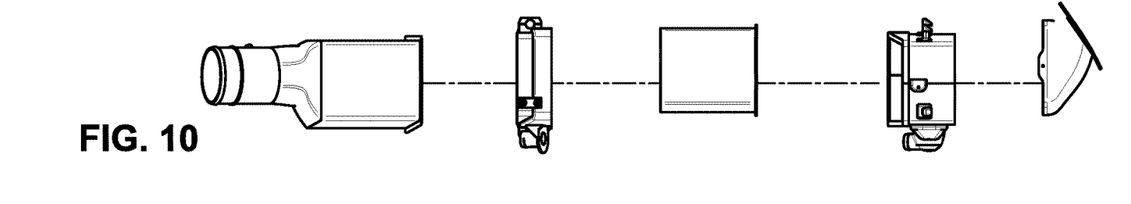
Figure 11:
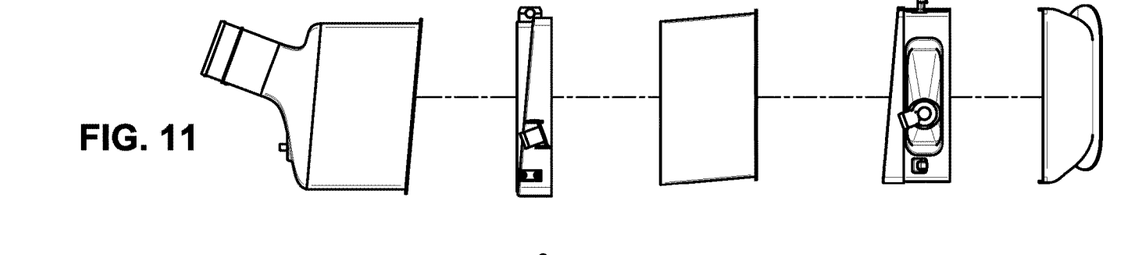
Figure 12:
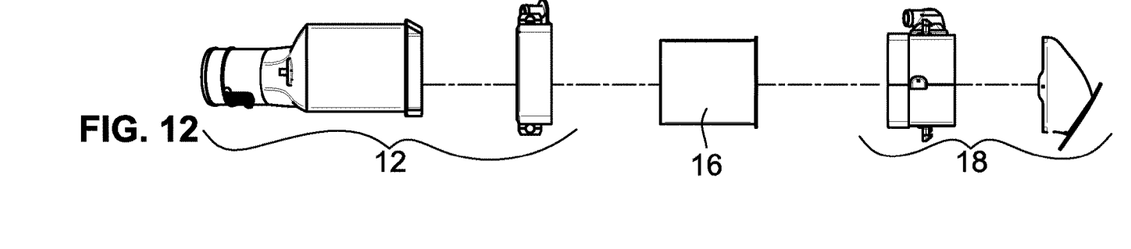

In an embodiment, the secondary filter element comprises a casing 26 including a casing body 28 extending from a first end 30 to a second end 32 and having a hollow interior defining a cavity 34 receiving the primary filter element 14. A filter member 36 is carried by the casing body 28 at the second end 32 and over the hollow interior cavity 34 downstream of the primary filter element 14, such that fluid cannot flow from the cavity 34 through the second end without passing through the filter member.

The precleaner 18 has an inlet port 38 to receive raw unfiltered air flow from the external environment that is often laden with dust, debris and other particulates. The precleaner has at least an air cleaning device that utilizes air flow to separate out larger particles prior to reaching the primary filter element 14. For example, the precleaner 18 may use centrifugal or change of direction cleaners such as shown in Lindstone, U.S. Pat. No. 4,218,223 entitled "precleaner for combustion engines" or utilize a bank of vortex separators such as in Dune, U.S. Pat. No. 4,746,340, entitled "Aircleaner Apparatus", the entire disclosures of which are hereby incorporated by reference in their entireties.

In an embodiment where a precleaner is used, the precleaner 18 is mounted to the filter housing 12 and encloses the primary filter element 14 and the secondary filter element 16 therein.

In accordance with an inventive aspect, a gasket member 40 seals simultaneously between the filter housing 12, the primary filter element 14, the secondary filter element 16 and the precleaner 18.

With this sealing arrangement, unfiltered air flow passes first through the precleaner 18, next through the primary filter element 14, then through the secondary filter element 16, whereby clean filtered air flow is received and ducted through the outlet port 24. Preferably, gasket member 40 is carried by and more preferably permanently attached (e.g. such as by integrally molded or adhesively attached) to the primary filter element 14 such that the gasket is replaced fresh each time.

Advantageously, the gasket member 40 may be a single gasket member permanently attached to the primary filter element 14 as illustrated.

While other shapes are possible, the filter housing 12, the primary filter element 14, the secondary filter element 16 and the precleaner 18 all have a quadrilateral shape which may be rectangular or non-rectangular. The housings/bodys/casings for the filter housing, the secondary filter element and the precleaner may all be molded plastic material.

With the quadrilateral shape, the filter housing 12 defines an quadrilateral body wall 42 surrounding the primary filter element 14 and the secondary filter element 16, and an end wall 44 (opposite of inlet opening 22) defining the outlet port 24 enclosing a first end of the quadrilateral body wall 42. The filter housing 12 may include at a second end of the quadrilateral body wall 42 a quadrilateral step 46. The step 46 can comprise a planar ledge 48 and a surrounding seal containment wall 50. In use, the single gasket member 40 extends outward from the filter media of the primary filter element 14 and is seated on the quadrilateral step 46 (either by an axial seal engagement with the ledge 48 or a radial seal engagement with the wall 50, or both; compression of the seal member 40 may also cause bulging of the seal member to create a radial seal).

When used with a precleaner or cover, the precleaner or cover has an axially extending quadrilateral seal engagement flange 52 facing the quadrilateral step 46 and engaging the gasket member 40.

To provide for ready servicing by a mechanic, the assembly further comprises manually actuated latches 54 removably securing the precleaner 18 and the filter housing 12 to allow for replacement of the primary filter element 14 (and optionally the secondary filter element) when desired and/or at regular service intervals. When serviced, the secondary filter element 16 may stay situated and in place while the primary filter is removed. The secondary filter element 16 can then be manually inspected and while installed helps prevent debris or dust created by the mechanic from entering the outlet port 24.

Another feature can be provided by virtue of a canted installation and/or canted shape to the primary and/or secondary filter elements.

The primary filter element 14 has filter media 56 extending between an inlet face 58 and an outlet face 60 with a filter media depth along the install axis that is not constant and that extends between the inlet face and the outlet face. To provide greater air flow near the outlet port and not create restriction, the filter media depth can be shallower proximate the outlet port 24 and deeper as the filter media 56 transitions away from the outlet port 24, in the installed position.

Preferably, the primary filter element 14 is a panel filter as shown, the filter media being in a pleated filter media pack 62 with a plurality of pleat tips 64 at the inlet face 58 and a plurality of pleat tips 64 at the outlet face 60. The pleat tips at the inlet face may form a plane in a typical arrangement. To provide for variable depth, the pleat tips 64 at the outlet face 60 can be stepped to form an incline relative to the plane at the inlet face 58.

These types of variable dimension filter media packs are shown for example in Tate et al, U.S. Application Ser. No. 62/243,740, entitled Filter Media Packs, Methods of Making and Filter Media Presses, the entire disclosure of which is hereby incorporated by reference. This shows that one or more dimensions of depth, width and length can be varied to achieve advantage.

In some embodiments, the incline of the outlet face is at least 3 degrees and preferably at least 5 degrees relative to the plane at the inlet face, and wherein the pleat tips are stepped at the outlet face to form said incline.

Another feature may be directed to inclined installation. The filter housing 12 includes at the quadrilateral step 46, the planar ledge 48 and the surrounding seal containment wall 50. With the primary filter cartridge being sealed against the planar ledge by the gasket, the containment wall 50, as shown, can define a terminating edge 66 (e.g. facing the precleaner 18 or cover) that lies in a plane that is inclined relative to the planar ledge 48.

The primary filter element 14 and/or gasket member 40 as illustrated also provides inventive features. The gasket member 40 is arranged in surrounding relation of one of the inlet face 58 and the outlet face 60 (and preferably and in this instance the inlet face 58). The gasket member 40 extends about a perimeter of the filter media pack 62 to form a complete ring.

The gasket member 40 has first and second opposed end surfaces 68, 70 that may be flat top and bottom surfaces, and an outer perimeter surface 72 extending between the first and second opposed end surfaces 68, 70.

Further, the gasket member 40 may include a receiving channel 74 recessed into the first end surface 70 (such as the bottom surface or surface opposite of the inlet face) of the gasket member 40 and in surrounding relation of the filter media pack 62.

Preferably, the recessed channel is formed by seal material of the gasket member 40 with the recessed channel 74 being surrounded by a continuous rib 76 also formed by the seal material.

The rib 76 has a flat bottom wall and the recessed channel 74 has a flat bottom wall in an embodiment, with the rib 76 and channel bottom connect by an axially extending wall (e.g. that may be vertical).

As shown, the gasket member 40 can be at least partially raised above the inlet face 58. Preferably, the seal material of seal member 40 is integrally molded to the filter media 56 to secure and seal the gasket to the filter media pack and preventing leakage of unfiltered fluid flow therebetween.

Additionally, the filter element 14 may include a screen member 78 extending across the inlet face and embedded in the seal material of the gasket member 40. The screen member 78 may be expanded wire mesh and larger mesh than that provided by the screen member of the secondary filter element 16.

Screen member 78 can add support to the pleated filter media pack 62 and also serve to intercept large objects such as leaves or other debris to attempt to avoid impact or damage to the pleated filter media pack 62. Additionally and contrary to many panel filters, this arrangement may provide the screen member 78 at the inlet face 58 and not the outlet. The outlet face 60 can be supported by the secondary filter element 16 if desired, or alternatively when embossed and made according to the aforementioned Tate et al, U.S. Application Ser. No. 62/243,740, has embossments that maintain pleat spacing to prevent blinding off.

A further feature and aspect pertains to the secondary filter element 16. The secondary filter element 16 comprises a casing 26, the casing including a casing body 28 surrounding the filter media pack 62 and extending between the inlet face and the outlet face 58, 60 as generally illustrated or can be inferred from the drawings.

The casing 26 is shown to include a flange 80 projecting radially outwardly from the casing body 28, the flange 80 received and having a sealing engaged position in the receiving channel 74 whereby a continuous seal surrounding the filter media pack is formed between projecting flange 80 and gasket member 40.

The filter member 36 of the secondary filter element 16 may be a filter screen member carried by the casing body 28 and extending over the outlet face of the primary filter element.

Preferably, the filter member 36 comprises a planar mesh screen material, in contrast to the filter media of the primary filter element that typically comprises a non-woven fibrous media comprising at least one of glass, cellulose or polymer material.

As alluded to above, the primary air filter element and the secondary filter 16 element can have at least one variable dimension that is either depth dimension that varies from the inlet face to the outlet, or a width or length dimension that varies between opposed sides of the quadrilateral.

An advantage in the present embodiment is that the secondary filter element 16 can be gasket free and utilizes only the gasket member 40 of the primary air filter element 14. As such, the secondary filter element 16 can be reused while a fresh seal supplied by the primary may be realized during primary filter element 14 replacement.

Further, the arrangement of the secondary filter element 16 surrounding the primary filter element 14 is a feature. The casing 26 includes the casing body 28 extending from a first end to a second end and having a hollow interior defining a cavity 34 for receiving another filter element such as the primary filter element 14. At the same time, the casing body 28 carries the filter member 36 at the second end and over the cavity 34, such that fluid cannot flow from the cavity through the second end without passing through the filter member 36.

As noted, the filter member 36 preferably comprises a planar mesh screen material, which is planar (and not pleated as per the primary filter element 14).

Further, with the casing 26 being formed of plastic material in an embodiment, casing plastic material can be integrally molded to the planar mesh screen material of filter member 36 as shown and thereby permanently securing the planar mesh screen material to the casing.

With this arrangement, the primary filter element 14 can be installed into the cavity 34 and sealing engaged at a periphery to the casing 26.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly for use in a filter housing, the filter assembly comprising a secondary filter element in combination with a primary air filter, the filter assembly comprising:
   the secondary filter element including a casing, the casing including a casing body extending from a first end to a second end and having a hollow interior defining a cavity for receiving another filter element, the primary air filter being installed into the cavity, wherein the primary air filter includes filter media;
   the secondary filter element including a filter member carried by the casing body at the second end and over the cavity, such that fluid cannot flow from the cavity through the second end without passing through the filter member; and
   wherein the primary air filter has exposed filter media sides around a periphery of the filter media protected by the casing of the secondary filter element without intervening structure therebetween.

2. The filter assembly of claim 1, wherein the filter member comprises a planar mesh screen material.

3. The filter assembly of claim 2, wherein the casing is formed of plastic material, and wherein the plastic material is integrally molded to planar mesh screen material and thereby permanently secures the planar mesh screen material to the casing.

4. The filter assembly of claim 1, wherein the primary air filter is sealing engaged at a periphery to the casing.

5. The filter assembly of claim 4, further comprising a gasket sealing between the secondary filter element and the primary air filter, wherein the gasket has a quadrilateral shape and engages a quadrilateral flange of the secondary filter element.

6. The filter assembly of claim 5, wherein the gasket is integrally provided by the primary air filter.

7. An air cleaner assembly including the filter assembly of claim 4, further comprising the filter housing in combination, the filter housing defining a housing cavity comprising an outlet port and an inlet opening, the primary air filter received in the filter housing through the inlet opening, the filter media comprising a non-woven fibrous media comprising at least one of glass, cellulose or polymer material; and a gasket member sealing simultaneously between the filter housing, the primary air filter element, and the secondary filter element.

8. The air cleaner assembly of claim 7, wherein the gasket member is provided by the primary air filter and defines a channel receiving a flange of the secondary filter element.

9. The air cleaner assembly of claim 8 wherein the gasket member is a single gasket member integrally molded to the filter media.

10. The air cleaner assembly of claim 7, wherein the filter media comprises a pleated filter media pack.

11. The air cleaner assembly of claim 7, further comprising a precleaner having an inlet port, the precleaner having at least an air cleaning device that utilizes air flow to separate larger particles prior to reaching the primary air filter, the precleaner mounted to the filter housing and enclosing the primary air filter and the secondary filter element therein.

12. An air cleaner assembly, comprising:
   a filter housing defining a housing cavity comprising an outlet port and an inlet opening;
   a primary filter element received in the filter housing through the inlet opening, the primary filter element comprising filter media that comprises a non-woven fibrous media comprising at least one of glass, cellulose or polymer material;
   a secondary filter element, comprising a casing, the casing including a casing body extending from a first end to a second end and having a hollow interior defining a cavity receiving the primary filter element, a filter member carried by the casing body at the second end and over the cavity downstream of the primary filter element, such that fluid cannot flow from the cavity through the second end without passing through the filter member and wherein the primary filter element has exposed filter media sides around a periphery of the non-woven fibrous media protected by the casing of the secondary filter element;
   a precleaner having an inlet port, the precleaner having at least an air cleaning device that utilizes air flow to separate larger particles prior to reaching the primary filter element, the precleaner mounted to the filter housing and enclosing the primary filter element and the secondary filter element therein; and
   a gasket member sealing simultaneously between the filter housing, the primary filter element, and the secondary filter element and the precleaner.

13. The air cleaner assembly of claim 12, wherein the gasket member is a single gasket member permanently attached to the primary filter element.

14. The air cleaner assembly of claim 13, wherein the filter housing, the primary filter element, the secondary filter element and the precleaner all have a quadrilateral shape, and wherein the filter housing defines a quadrilateral body wall surrounding the primary filter element and the secondary filter element, and an end wall defining the outlet port enclosing a first end of the quadrilateral body wall, the filter housing including at a second end of the quadrilateral body wall a quadrilateral step comprising a planar ledge and a surrounding containment wall, the single gasket member extending outward from the filter media and seated on the quadrilateral step.

15. The air cleaner assembly of claim 14, wherein the precleaner has an axially extending quadrilateral flange facing the quadrilateral step and engaging the gasket member.

16. The air cleaner assembly of claim 12, further comprising manually actuated latches removably securing the precleaner and the filter housing.

17. An air filter element adapted for use with a secondary filter element and a filter housing, comprising:
   a filter media pack comprising filter media, the filter media pack having an inlet face and an outlet face, wherein fluid is adapted to flow from the inlet face to the outlet face by passing through the filter media to filter the fluid;
   a gasket arranged in surrounding relation of one of the inlet face and the outlet face, the gasket extending about a perimeter of the filter media pack to form a complete ring that is configured for sealing both with the secondary filter element and the filter housing wherein,
   the gasket having first and second opposed end surfaces and an outer perimeter surface extending between the first and second opposed end surfaces; and
   wherein the filter media pack has exposed unprotected filter media sides, the exposed unprotected media sides extending axially from the gasket around the air filter element.

18. The air filter element of claim 17, further comprising a receiving channel recessed into the first end surface of the gasket in surrounding relation of the filter media pack, wherein the receiving channel is formed by seal material of the gasket and wherein the receiving channel is surrounded by a continuous rib formed by a seal material of the gasket, wherein the receiving channel is configured to seal against the secondary filter element and the continuous rib is configured to seal against the filter housing.

19. The air filter element of claim 18, wherein the gasket is at least partially raised above the inlet face and wherein the seal material is integrally molded to the filter media pack to secure and seal the gasket to the filter media pack and preventing leakage of unfiltered fluid flow therebetween.

20. The air filter element of claim 19, wherein the air filter element is a panel filter, the filter media pack being pleated with a plurality of pleat tips at the inlet face and a plurality of pleat tips at the outlet face.

21. The air filter element of claim 20, further comprising a screen member extending across the inlet face and embedded in the seal material of the gasket.

22. A filter assembly comprising the air filter element of claim 18 and further comprising the secondary filter element covering and protecting the exposed unprotected filter media sides,
   the secondary filter element comprising a casing, the casing including a casing body surrounding the filter media pack and extending between the inlet face and the outlet face, the casing including a flange projecting radially outwardly from the casing body, the flange received and having a sealed position in the receiving channel whereby a continuous seal surrounding the filter media pack is formed between the projecting flange and the gasket, and further comprising a filter member carried by the casing body and extending over the outlet face of the filter media pack.

23. The filter assembly of claim 22, wherein the filter member comprises a planar mesh screen material, and wherein the filter media comprises a non-woven fibrous media comprising at least one of glass, cellulose or polymer material.

24. The filter assembly of claim 23, wherein the air filter element and the secondary filter element are both quadrilateral.

25. The filter assembly of claim 24, wherein the air filter element and the secondary filter element have at least one variable dimension that is either a depth dimension that varies from the inlet face to the outlet, or a width or length dimension that varies between opposed sides of the quadrilateral.

26. The filter assembly of claim 22, wherein the secondary filter element is gasket free and utilizes only the gasket of the air filter element.

27. An air filter element adapted for use with a secondary filter element having a sealing flange and a filter housing having a sealing seat, the air filter element comprising:
   a filter media pack comprising filter media, the filter media pack having an inlet face and an outlet face, wherein fluid is adapted to flow from the inlet face to the outlet face by passing through the filter media to filter the fluid;
   a gasket member having a quadrilateral shape, the gasket defining a gasket flange extending radially outwardly from the filter media pack to form a complete ring, wherein the gasket flange is configured for sealing both with the sealing flange of secondary filter element and the sealing seat of the filter housing; and
   wherein the filter media pack has exposed unprotected sides disposed around an outer periphery of the air filter element and extending in a region between the inlet face and the outlet face.

28. The air filter element of claim 27, wherein the gasket flange has first and second opposed end surfaces and an outer perimeter surface extending between the first and second opposed end surfaces, wherein one of the first end surface defines a recessed channel sized to receive and seal against the sealing flange, and with the receiving channel being surrounded by a continuous rib, the continuous rib sized to sealingly engage the sealing seat of the filter housing.

29. The air filter element of claim 27, wherein the gasket flange has first and second opposed end surfaces and an outer perimeter surface extending between the first and second opposed end surfaces, wherein the first end surface defines an axial seal surface configured for sealing against both of the sealing seat and the sealing flange.

30. The air filter element of claim 27, wherein the gasket flange has first and second opposed end surfaces and an outer perimeter surface extending between the first and second opposed end surfaces, wherein the first end surface defines an axial seal surface configured for sealing axially against the sealing flange and the outer perimeter surface defines a radial seal surface configured for sealing radially against the filter housing along the sealing seat.

31. The air filter element of claim 27, wherein the gasket member is a single gasket member integrally molded to the filter media pack, the filter media pack being of a quadrilateral shape.

32. An air cleaner assembly including the air filter element of claim 27 being in combination with the secondary filter element and the filter housing, the air cleaner assembly further comprising:

the filter housing defining a housing cavity comprising an outlet port and an inlet opening;

the air filter element being a primary filter element received in the filter housing through the inlet opening, the primary filter element comprising filter media that comprises a non-woven fibrous media comprising at least one of glass, cellulose or polymer material;

the secondary filter element, comprising a casing, the casing including a casing body extending from a first end to a second end and having a hollow interior defining a cavity receiving the primary filter element, a filter member carried by the casing body at the second end and over the cavity downstream of the primary filter element, such that fluid cannot flow from the cavity through the second end without passing through the filter member; and the gasket member sealing simultaneously between the filter housing, the primary filter element, and the secondary filter element.

33. The air cleaner assembly of claim 32, wherein the gasket member is a single gasket member permanently attached to the primary filter element.

\* \* \* \* \*